Patented Sept. 13, 1927.

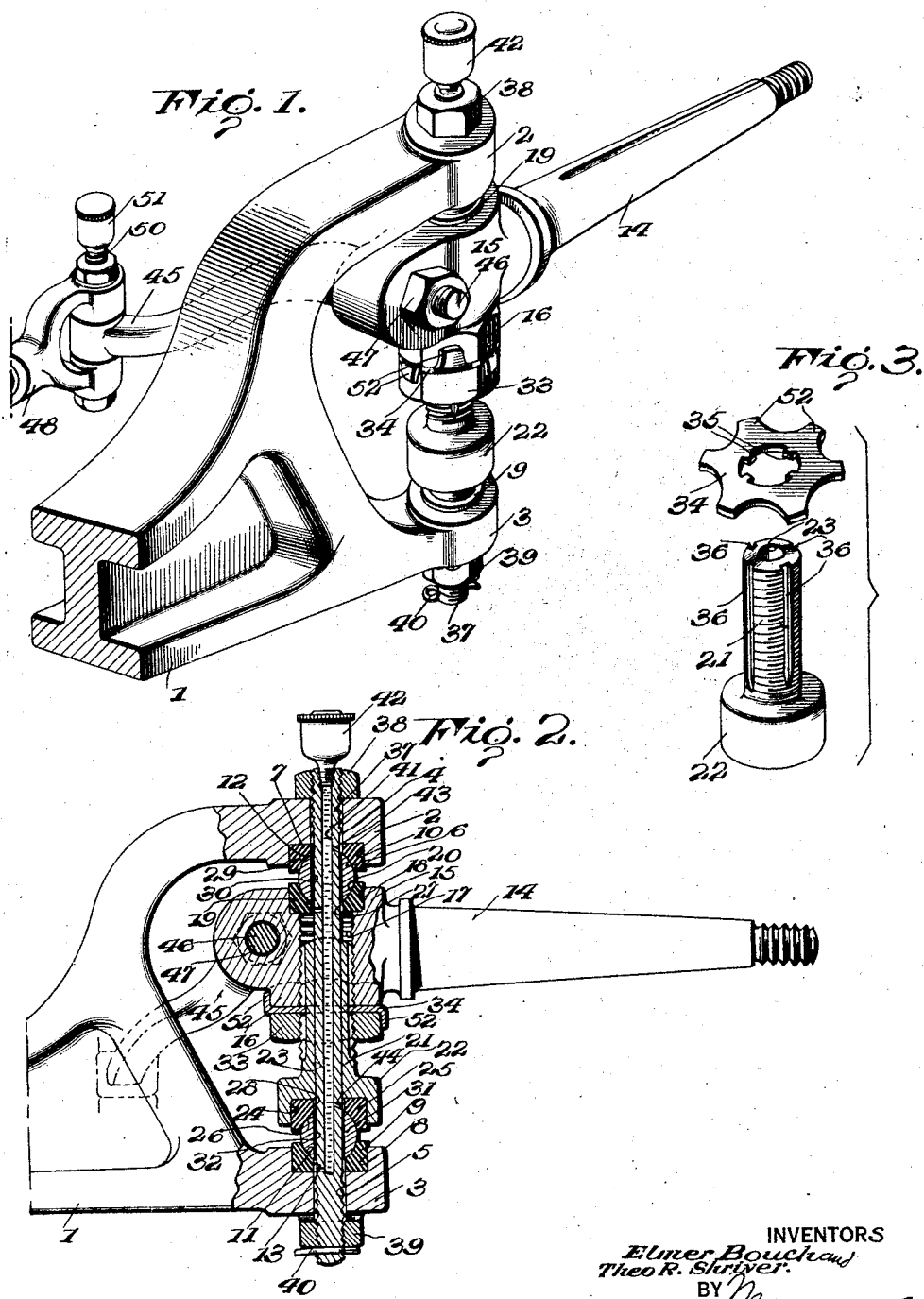

1,642,640

UNITED STATES PATENT OFFICE.

ELMER BOUCH AND THEO R. SHRIVER, OF WORTHINGTON, PENNSYLVANIA.

ADJUSTABLE STEERING KNUCKLE.

Application filed October 6, 1926. Serial No. 139,941.

Our invention relates to improvements in adjustable steering knuckles for automobiles, and it consists in the combinations, constructions, and arrangements herein described and claimed.

An object of our invention is to provide a reliable and efficient steering knuckle construction which affords facilities for mounting the spindle thereof to turn anti-frictionally and so that the spindle bearings will be kept well lubricated and can be adjusted quickly and easily when required to compensate for wear thereon.

A further object of the invention is the provision in an adjustable steering knuckle of a simple and efficient locking means for locking the adjusting means for the spindle bearings against accidental displacement from any given adjustment.

Other objects and advantages of the invention will be apparent from the following description, considered in conjunction with the accompanying drawings, in which Figure 1 is a perspective view of the improved steering knuckle construction applied to an end portion of an axle, Figure 2, is a side elevation of the structure exhibited in Figure 1 with the spindle mounting means partially broken away and shown partially in section, and Figure 3 is a perspective group view of an adjusting screw bushing and a lock washer which are used in the spindle mounting means.

In Figures 1 and 2, we show an end portion of an axle having at its extremity vertically spaced substantially horizontal branches 2 and 3, respectively. The axle end branches 2 and 3 are provided with alined vertical openings 4 and 5, respectively. The opening 4 of the branch 2 has an enlarged lower end portion 6 in which a brass bearing member 7 is secured rigidly in any suitable known manner, as by having a driving fit with the wall of the portion 6 of the opening 2.

The upper end portion of the opening 5 is enlarged at 8 and a brass bearing member 9, similar to the bearing member 7, is secured therein.

The bearing members 7 and 9 have vertically alined concave sockets 10 and 11, respectively in their adjacent faces and have central bores 12 and 13, respectively, extending vertically from the central portions of the walls of the sockets 10 and 11, respectively through the remaining portions of the bearing members 7 and 9, respectively. The bores 12 and 13 are in register and co-extensive in cross sectional area with the openings 4 and 5, respectively.

A spindle 14 has a body 15 formed with a depending non-circular boss 16 at its lower side and with a vertical bore 17 which extends through the boss 16 centrally of the latter. The bore 17 has its upper end portion enlarged at 18 for the reception of a brass bearing member 19. The bearing member 19 is secured rigidly in place in the part 18 of the spindle body in any suitable known manner and is formed with a concave socket 20 in its upper side similar to and in alinement with the socket 10 of the bearing member 7.

The bore 17 of the body of the spindle is provided with screw threads with which the screw threads on the shank 21 of a headed adjusting bushing are adjustably engaged, the head 22 of the bushing being located at the lower end of the bushing shank 21.

The bushing 21—22 is formed with an axial bore 23 which extends for the entire length of the bushing and is enlarged at its lower end in the lower portion of the bushing head 22 as indicated at 24 for the reception of a brass bearing member 25. The latter is secured rigidly in place in the part 24 and is provided in its lower part with a central concave socket 26 which is in alinement with the socket 11 in the bearing member 7 and is similar to the socket 11. The bearing members 19 and 25 have alined vertical openings 27 and 28, respectively, which are axially alined with the sockets 20 and 26, the sockets 10 and 11, the openings 12 and 13, the openings 4 and 5, and the bore 23. The openings 4, 12, 27, 28, 13 and 5 are preferably co-extensive in cross-sectional configuration and area and are slightly larger in cross-sectional area than the bore 23. A hardened steel ball bearing 29 is disposed between the brass bearing members 7 and 19 and is partially received in each of the concave sockets 10 and 20, the surface of the ball 29 and the walls of the sockets 10 and 20 being correspondingly curved. The ball member 29 has a diametrical bore 30 which is in alinement with the openings 12 and 27 in the bearing members 7 and 19, respectively. The bore 30 of the ball 29 preferably has the same area and configuration in cross section as the openings 12 and 27. A lower hardened steel ball bearing 31 is similar to the ball 29 and is disposed between the bearing members 25 and 9, being partially received in the sockets 26 and 11. The ball 31 has a diametrical bore 32 in alinement with the openings 28 and 13 and of the same cross sectional area and configuration as the openings 28 and 13.

A lock nut 33 is adjustably engaged with the shank 21 of the adjusting bushing and a lock washer 34 is slidable on the shank 21 of the adjusting bushing between the lock nut 33 and the lower face of the boss 16 on the spindle body. The lock washer is held against rotation on the shank 21 of the adjusting bushing by inwardly extending integral projections 35 which are provided at the inner edge of the lock washer and which enter and engage with longitudinal grooves 36 in the outer wall of the shank 21 of the adjusting bushing.

The spindle body, the adjusting bushing, and the ball members 29 and 31 are held against accidental displacement from their hereinbefore described positions between the arms 2 and 3 of the axle end by a spindle bolt 37 which is projected from above the branch 2 of the axle end through the openings 4, 12, 30, 27, the bore 23, and the openings 28, 32, 13, and 5 in turn. The spindle bolt 37 is rather loosely received in the openings 4, 12, 30, 27, 28, 32, 13, and 5 but is journalled in the bore 23 of the adjusting bushing. The head 38 of the spindle bolt rests upon the upper side of the branch 2 of the axle end and a nut 39 is in threaded engagement with the lower end portion of the spindle bolt and is tightened against the lower side of the branch 3 of the axle end to hold the spindle bolt rigid with the axle. Accidental loosening and loss of the nut 39 may be prevented by a cotter pin 40 in a transverse opening in the lower end portion of the spindle bolt.

The spindle bolt 37 has a vertical bore 41 formed through the head 38 and downward in the shank of the spindle bolt substantially to the level of the lower face of the lower bearing member 9. An oiler 42 is secured in the upper part of the bore 41 and feeds oil into the bore 41, whence oil passes through small inclined ports 43 and 44, respectively, between cooperative members of the hereinbefore described upper and lower bearing units.

A spindle arm 45 has a reduced threaded front end portion 46 projected through a transverse opening in the inner end portion of the spindle body and secured to the spindle body by a nut 47. The rearward end portion of the spindle arm is held between the forks of an end portion of an actuating rod 48 by a vertical pivot bolt 50 with which an oiler 51 may be associated so that the joint between the spindle arm 45 and the rod 48 will be well lubricated.

From the foregoing description of the various parts of the device, the operation thereof may be readily understood. The adjusting bushing 21—22 is turned on the spindle bolt and in engagement with the threaded bore 17 of the spindle body until the movable socket members of the upper and lower bearing units have been adjusted relatively to the fixed socket members of the upper and lower bearing units as required to prevent play between relatively moving parts of the spindle body mounting means when the spindle is swung about the axis of the spindle bolt. The lock washer 34 has spaced radial bendable locking projections 52 at its outer edge and when the desired adjustment of the adjusting bushing in the bore 17 of the spindle body has been effected, the lock nut 33 is tightened to clamp the lock washer between the lock nut and the boss 16 on the spindle body and alternate projections 52 then are bent against lateral faces of the boss 16 and the nut 33, respectively. The nut 33 then will be locked against retrograde movement on the shank of the adjusting bushing and the bushing will be connected with the spindle body to swing with the spindle body about the axis of the spindle bolt 37. The projections 52 can be bent from the positions shown in Figures 1 and 2 substantially to the positions shown in Figure 3 when it is desired to release the adjusting bushing from the spindle body to permit such further adjustment of the members of the upper and lower bearing units as may be required to compensate for wear. The brass or relatively soft members of the bearing units can be replaced when worn easily and at slight cost. It is to be noted, however, that the efficient lubrication of the bearings as hereinbefore described will tend to prevent wear so that frequent renewal or replacement of the brass or relatively soft members of the bearing units is not likely to be required.

Obviously, the invention is susceptible of embodiment in forms other than those which are illustrated in the accompanying drawings and we therefore consider as our own all such modifications and adaptations thereof as fairly fall within the scope of the appended claims.

We claim:

1. A steering knuckle construction comprising an axle having a pair of spaced branches, a spindle bolt extending between said branches, a spindle having a body formed with an opening through which said spindle bolt extends loosely, a spindle body bushing rotatable and axially movable on said spindle bolt, said bushing having a portion adjustably engaged with the wall of said opening of the spindle body, and adjustable anti-friction bearings between said spindle body and one of said axle branches and between the outer end of said bushing and the other axle branch, respectively.

2. A steering knuckle construction comprising an axle having a pair of spaced branches, a spindle bolt extending between said branches, a spindle having a body formed with an opening through which said spindle bolt extends loosely, a spindle body bushing rotatable and axially movable on said spindle bolt, said bushing having a portion adjustably engaged with the wall of said opening of the spindle, and releasable means for locking said bushing to said spindle body.

3. A steering knuckle construction comprising an axle having a pair of spaced branches, a spindle bolt extending between said branches, a spindle having a body formed with an opening through which said spindle bolt extends loosely, a spindle body bushing rotatable and axially movable on said spindle bolt, said bushing having a portion adjustably engaged with the wall of said opening of the spindle, said spindle bolt having a bore extending from one end of the bolt for part of its length, said bolt also having small passages leading from said bore to the spaces between the members of said anti-friction members, and a lubricator disposed in the outer end of said bore.

4. A steering knuckle construction comprising an axle having a pair of spaced branches, a spindle bolt extending between said branches, a spindle having a body formed with an opening through which said spindle bolt extends loosely, a spindle body bushing rotatable and axially movable on said spindle bolt, said bushing having a portion adjustably engaged with the wall of said opening of the spindle body, and adjustable anti-friction bearings between said spindle body and one of said axle branches and between the outer end of said bushing and the other axle branch, respectively, said anti-friction bearings comprising socket members of relatively soft material secured to said axle branches in encircling relation to said spindle bolt, other similar socket members encircling said spindle bolt and respectively secured to said spindle body and the outer end portion of said bushing in positions to cooperate with the first named socket members, and hardened ball bearings mounted on said spindle bolt between the cooperative first and second named socket members.

5. A steering knuckle construction comprising an axle having a pair of spaced branches, a spindle bolt extending between said branches, a spindle having a body formed with an opening through which said spindle bolt extends loosely, a spindle body bushing rotatable and axially movable on said spindle bolt, said bushing having a portion adjustably engaged with the wall of said opening of the spindle body, said axle branches having alined openings and the end portions of said spindle bolt extending through said last named openings, and means at the opposite ends of said spindle bolt for engaging with the axle branches for locking the spindle bolt thereto.

ELMER BOUCH.
THEO R. SHRIVER.